United States Patent [19]

Hilliard et al.

[11] Patent Number: 5,106,591
[45] Date of Patent: Apr. 21, 1992

[54] SALT HANDLING APPARATUS FOR A HYPOCHLOROUS ACID REACTOR

[75] Inventors: Garland E. Hilliard; James K. Melton; John H. Shaffeer, all of Cleveland, Tenn.; Jerry R. Johanson, San Luis Obispo, Calif.

[73] Assignee: Olin Corporation, Cheshire, Conn.

[21] Appl. No.: 674,416

[22] Filed: Mar. 22, 1991

Related U.S. Application Data

[63] Continuation of Ser. No. 293,727, Jan. 5, 1989, abandoned.

[51] Int. Cl.⁵ .............................. B01J 8/00; B01J 10/00
[52] U.S. Cl. ........................................ 422/232; 55/164; 55/218
[58] Field of Search ............... 422/143, 144, 145, 147, 422/234, 261, 264, 266, 282, 232, 129, 187; 55/164, 218, 430, 432, 459.1; 222/64, 190, 195, 450; 423/473

[56] References Cited

U.S. PATENT DOCUMENTS

| | | | |
|---|---|---|---|
| 3,097,828 | 7/1963 | Gran | 222/195 |
| 3,581,951 | 6/1971 | Sutter | 222/190 |
| 3,739,313 | 5/1973 | Gauthier et al. | 222/69 |
| 4,146,578 | 3/1979 | Brennen et al. | 423/473 |
| 4,223,044 | 9/1982 | Se | 222/195 |
| 4,325,496 | 4/1982 | Morris | 222/195 |
| 4,327,066 | 6/1982 | Kunii | 422/147 |
| 4,341,492 | 7/1982 | Montgomery et al. | 222/195 |
| 4,527,714 | 7/1985 | Bowman | 222/64 |
| 4,729,772 | 3/1988 | Asanuma et al. | 55/1 |
| 4,803,003 | 8/1989 | Dewitz | 55/459.1 |

Primary Examiner—Peter Kratz
Attorney, Agent, or Firm—Ralph D'Alessandro

[57] ABSTRACT

An elongated, generally vertically extending reactor vessel for the production of hypochlorous acid by the mixing and reaction of a liquid alkali metal hydroxide and a gaseous halogen is provided with solids discharge handling apparatus connected to the bottom to remove the solid by-product. The discharge handling apparatus uses the solids to effect a seal to prevent the intrusion of outside air into the reactor and the escape of halogen and product gas to the outside atmosphere.

9 Claims, 2 Drawing Sheets

SALT HANDLING APPARATUS FOR A HYPOCHLOROUS ACID REACTOR

This application is a continuation of application Ser. No. 07/293,727, filed Jan. 5, 1989, now abandoned.

BACKGROUND OF THE INVENTION

This invention relates generally to the solids discharge handling apparatus associated with a reactor vessel system and, more specifically to that apparatus associated with a reactor vessel for the production of hypohalogenated acid by the mixing and reaction therein of an alkali metal hydroxide and a gaseous halogen. A preferred product acid is hypochlorous acid.

Hypochlorous acid is used extensively in the preparation of chlorohydrin and chloramines. Chloroisocyanurates are typical examples. Hypochlorous acid has been produced by several processes or techniques. The use of dilute hypochlorous acid and large quantities of halogen to produce hypohalites, such as sodium hypochlorite, is recent.

One technique employs the process in which chlorine, steam and air are bubbled through an aqueous solution of an alkali earth metal hypochlorite, such as calcium hypochlorite, to remove the resulting hypochlorous acid in vapor form. The hypochlorous acid is then condensed and stored for use. This process, however, produces a large volume of undesirable by-product, calcium chloride.

Another process uses a low concentration of aqueous caustic solution to scrub chlorine gas. However, the solution has an available chlorine content of about only 5% and, because of the chloride ion content, the hypochlorous acid that is formed quickly decomposes, most preferably to chloric acid.

Another related process prepares a solid mixture of alkali metal hypochlorite and alkali metal chloride by reacting chlorine gas with a spray of alkali metal hydroxide, while drying with a gas the reactants and product. Some cooling of the reacting chemicals and the drying gas may be done. The primary products of this process have very limited utility.

A more recent process, which produces hypochlorous acid vapor, sprays aqueous alkali metal hydroxide in droplet form or solid alkali metal hydroxide particles into gaseous chlorine. This approach attempts to utilize droplet sizes to attain the maximum surface to volume ratio possible. Droplets having an average diameter of less than about 1000 microns are employed.

These previous processes, and the apparatus employed to produce these processes, have suffered from not achieving substantially complete reactions between the chlorine and the alkali metal hydroxide. A critical factor in determining the complete reaction is the droplet size of the alkali metal hydroxide. It is also desirable that any hypochlorous acid produced and any water present be readily vaporizable. The salt particles produced as by-products in any process should be dry to facilitate handling and be continuously removable from the reaction while maintaining a seal to the atmosphere to prevent the gaseous product from escaping to the surrounding area and to prevent atmospheric gases from mixing with the gaseous product. The increased concentration of water and inert gases such as oxygen and nitrogen, in the reactor system when atmospheric gases intrude reduces the operating efficiency of the system. The salt particles should be sized so that they readily separate from the gaseous product mixture of hypochlorous acid.

Prior processes have produced oversized alkali metal hydroxide droplets that result in the undesired reaction of hypochlorous acid and the oversized particles to produce significant alkali metal chlorates. These oversized particles then retain excessive moisture so that caking results and the caked mass adheres to the reactor surfaces. These oversized particles can hamper the by-product salt removal additionally. The presence of such alkali metal chlorates reflect reduced yields of the desired hypochlorous acid, while increasing the raw material and operating costs. Lastly, the presence of halogen gas in the porous solid by-product salt can cause the salt to clump or bind together, thereby plugging the salt handling apparatus.

These problems are solved in the design of the present invention wherein by-product salt handling apparatus is provided for a reactor vessel for the production of a hypohalogenated acid in which the mixing and reaction of alkali metal hydroxide and a gaseous halogen occurs.

SUMMARY OF THE INVENTION

It is an object of the present invention to provide a solids discharge system for use within a system employing a reactor vessel within which a gas phase controlled reaction occurs to produce a hypohalogenated acid.

It is another object of the present invention to provide a solid by-product salt handling apparatus for a reactor vessel in which both a liquid-gas reaction and drying occur to produce a gaseous product and the solid by-product.

It is a feature of the present invention that a gas seal is provided in the salt handling apparatus from both the atmosphere and the system components to preclude the escape of gaseous product into the surrounding atmosphere and the intrusion of atmospheric gases into the system.

It is another feature of the present invention that the salt handling apparatus connected to reactor vessel has a valving arrangement to control the release of the by-product salt from the salt handling apparatus and minimize the amount of halogen gas and stripping air leakage.

It is still another feature of the present invention that a halogen stripper is located in the salt handling apparatus to remove any trapped gaseous halogen from the porous solid by product salt by the injection of air.

It is yet another feature of the present invention that the solid by-product salt can be continuously removed in dry form from the reactor vessel and the salt handling apparatus.

It is still another feature of the present invention that the gas seal is provided by a bed or leg of salt within the salt handling apparatus.

It is an advantage of the present invention that the production of oversized alkali metal hydroxide droplets are avoided and that undesirable secondary reactions are minimized, while permitting the solid by-product salt to be removed from the system.

It is another advantage of the present invention that the removal of the solid by-product salt in dry form from the system provides inexpensive flexibility in the desired end use of such a product.

These and other objects, features and advantages are provided in solid a discharge handling system including by-product salt handling apparatus associated with a reactor vessel for the production of a hypohalogenated acid from the mixing and reaction of an alkali metal hydroxide and gaseous halogen in the reactor vessel. The salt handling apparatus permits the continuous removal of the solids discharge from the system and specifically permits salt to be removed in dry form.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
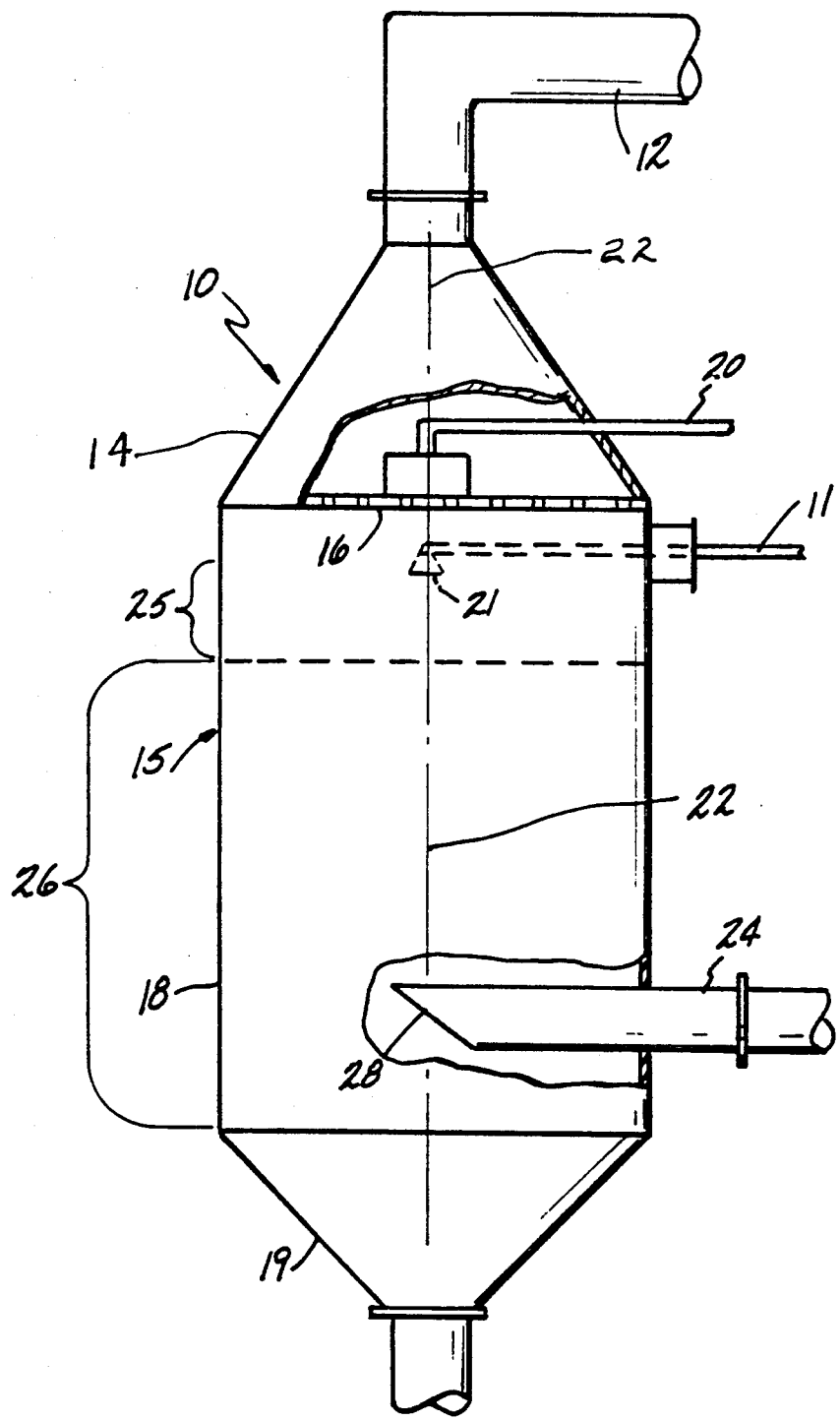
FIG. 1 is a side elevational view of the reactor vessel.

FIG. 1 shows the reactor, indicated generally by the numeral 10, which reacts the liquid alkali metal hydroxide, such as caustic, supplied by feed line 11 with the gaseous halogen, such as chlorine, to produce the solid salt crystals and the gaseous product, such as HOCl. Although the reactor will be discussed in terms of producing hypochlorous acid, it is to be understood that any halogen could be employed to produce hypohalogenated acid, for example, hypobromous or hypofluorous acid. The HOCl is condensed to produce liquid hypochlorous acid which, for example, can be mixed with a lime slurry to produce calcium hypochlorite. Gaseous chlorine, along with some chlorine monoxide in the recycle system, is fed into reactor 10 via gas infeed 12 in the top 14. Top 14 is in the shape of an inverted funnel, that can be constructed of a suitable corrosion resistant material, such as titanium; coated titanium; an alloy of nickel, chrome, molybdenum, iron and other materials; tantalum; and lined carbon steel or lined fiberglass reinforced plastic. The lining can be a suitable polyfluoropolymer.

Reactor vessel 15 has a perforated plate 16 at the top between the reactor top 14 and the vessel 15. The plate 16 is also made of a suitable corrosion resistant material, such as polytetrafluoroethylene or one of the above mentioned materials with respect to top 14, and serves to create a straight concurrent flow path for the chlorine gas flowing down from the top 14. Ethylene chlorotrifluoroethylene has also been used as a construction material for reactor vessel 15. Vessel 15, similarly can be made from any suitable corrosion resistant material, such as carbon steel with a liner or coating of a suitable perfluoropolymer, such as that sold under the tradename TEFLON$^{(R)}$ PFA.

Reactor vessel 15 has a generally elongated cylindrical central section 18 which tapers to a conically shaped funnel bottom 19 to permit solid alkali metal halide salt, such as NaCl, product to discharge out through a standpipe, not shown, for further processing. Vessel 15 has a caustic feed line 11 that enters through its side and provides the caustic to an atomizer nozzle 21. Nozzle 21 is mounted along the center line 22 of the vessel 15 about six (06) inches below the top of vessel 15. Nozzle 21 creates caustic droplets of a desired size between about 50 to 200 microns which are of sufficient size to absorb virtually all of the gaseous chlorine feed while the chlorine and caustic react fast to produce the gaseous and solid products as shown in the equation:

$$NaOH + Cl_2 \rightarrow HOCl + NaCl$$

The reaction occurs at a pH of about 4 to about 6 with a stochiometric ratio of about 30 to 1 chlorine to caustic. The gaseous HOCl is condensed : between about 0 to about 10° C. after exiting the reactor to recover a concentrated HOCl solution.

Recycled gases, such as chlorine and chlorine monoxide, are exhausted from the vessel 15 through exhaust duct 24 and are fed back into reactor 10 via a recirculation loop, after passing through a heat exchanger (not shown) to achieve the necessary heat, when combined with the heat of reaction to evaporate the hypohalogenated acid, such as hypochlorous acid, and water phase to leave a dry sodium chloride or salt solid by-product. The desired reaction temperature ranges from about 80° to about 100° centigrade. The recycled gases are also used as reactant gases in the production of the hypohalogenated acid.

The recycled gases, for example chlorine and chlorine monoxide, enter the reactor vessel 15, disperse outwardly in the inverted funnel top 14 and pass through the flow directing means or perforated plate 16 to enter the reactor vessel 15 in a generally vertical flow orientation. Fresh halogen gas, for example chlorine, is fed in through chlorine feed line 20 through the reactor top 14 and is directed down over the nozzle or atomizer 21.

Nozzle 21 may be a single fluid atomizer, a two fluid nozzle or a wheel atomizer dependent upon the viscosity and destiny of the alkali metal hydroxide being atomized and the amount of pressure to which the liquid is subjected. The materials of construction of the nozzle must be capable of withstanding the harshness of the environment within the reactor.

Figure 2:
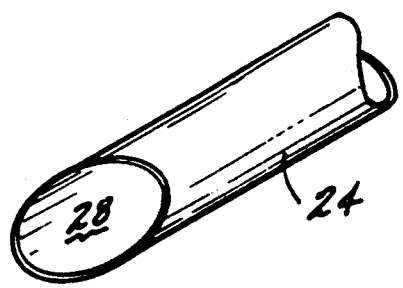
FIG. 2 is a bottom perspective view of the ellipsoid inlet for the exhaust duct.

The vessel 15 has an outlet or exhaust duct 24 at the bottom of the drying zone 26 just above the funnel or conically shaped bottom 19 to remove the product gas, the unreacted halogen gas and some by-product into the recirculation loop as previously described. Outlet or exhaust duct 24 exits through the side of vessel 15 generally horizontally and has an inlet 28 that is undercut such that the top overhangs or overlies and covers the bottom to preclude solid alkali metal chloride by-product, for example sodium chloride, from falling directly into it. The preferred shape of the inlet 28 is an undercut ellipsoid, as seen in FIG. 2.

The vessel 15 has its central section 18 preferably cylindrically shaped, but it could also be polygonal, as appropriate. the cylindrical design has a desired diameter and length. The length extends from the top at the perforated plate 16 to the bottom of the drying zone 26, just above the funnel bottom 19. The dimensions of the length and the diameter can be selected so that the length to diameter ratio, 1/d, can range from about 1 to 1 to about 1 to 5.

In operation the halogen gas, for example chlorine, is fed into the reactor 10 through feed line 20 and is directed generally vertically downward over nozzle 21. Recycled gases are fed in from the recirculation system via gas infeed 12 into the reactor top 14 and are directionalized by perforated plate 16 down into reactor vessel 15. Vessel 15 has an elongate cylindrical section 18 which has a spraying and drying zone 25 adjacent the top surrounding nozzle 21 and a drying zone 26 therebelow.

The reacted gases exit the reactor 10 through outlet or exhaust duct 24 for processing and recirculation, as appropriate. The solid by-product alkali metal halide, such as sodium chloride, exits the vessel 15 through the conically shaped funnel bottom 19 for processing. Bottom 19 is connected by conventional flanging to connecting pipes (not shown).

The solid by-product alkali metal halogen is dried as it passes down through the drying zone 26. The overhanging top portion of exhaust duct 24 prevents substantial quantities of the solid by-product from being drawn out through the undercut ellipsoid inlet 28 with the product HOCl gas and the recycle gases.

Figure 3:
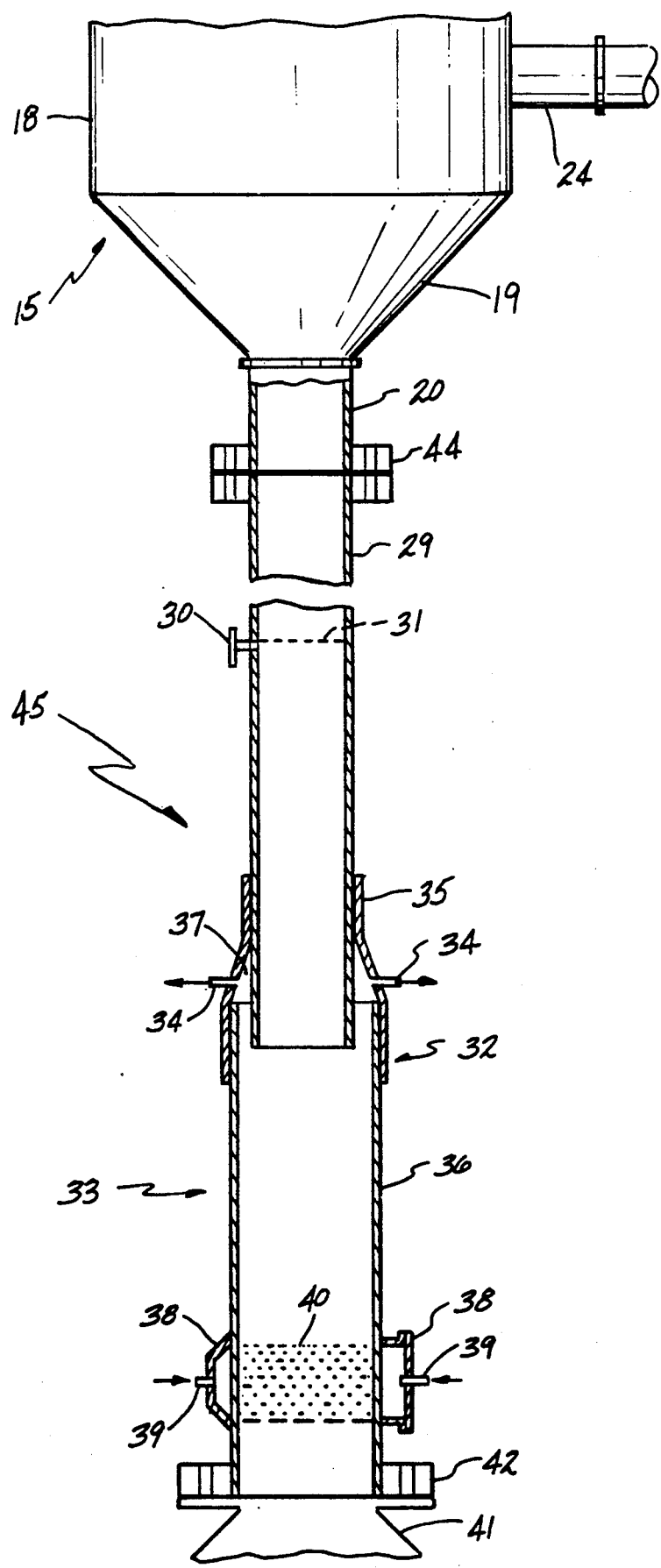
FIG. 3 is side elevational view of the salt handling apparatus.

FIG. 3 shows the solids discharge handling apparatus preferably for granular solids indicated generally by the numeral 45, connected to the bottom 19 of reactor vessel 15 via connecting pipe 20. Pipe 20 is connected to the salt handling standpipe 29 by flanges 44.

Solid salt by-product is retained in the standpipe 29 by valve means 41 that selectively discharges the dry by-product while ensuring sufficient quantity of solid salt by-product remains in the solids discharge handling apparatus 45 to maintain a seal to the atmosphere, as previously described. Apparatus 45 initially can be seeded with the required amount of solid by-product to establish the seal. Valve means 41 can be any appropriate system that is halogen impervious and suitably sealable to prevent the escape of the gaseous product to the surrounding atmosphere and the intrusion of atmospheric gases into the system. A double valve airlock system has been employed using, for example, a disk valve and a knife valve.

The desired by-product salt level within the standpipe 29 is shown by numeral 31. This is at the level or height of level controller 30 that has a feed-forward connection to the valve means 41 to signal when the valve means 41 should be opened for discharge. Level controller 30 can be a microwave level transmitter/sensor, as well as a point level probe. One method of employing the feed forward system has employed a solenoid valve as a pneumatic control for the opening or closing of valve means 41.

A stripping section, indicated generally by the numeral 33, is connected to standpipe 29 by a standpipe annulus 32. Annulus 32 consists of a standpipe jacket 35 that is appropriately fastened to standpipe 29, such as by welding, and four exhaust ports 34 90° apart in jacket 35 for carrying chlorine gas and air to an exhaust manifold and scrubber (both not shown). Stripper pipe 36 inserts within the lower outwardly tapered portion of standpipe jacket 35 to thereby form an annular chamber 37 from which the chlorine and gas mixture is drawn off as a result of a negative pressure system through the scrubber.

Stripping section 33 includes vertically extending stripper pipe 36, stripper jacket 38 that extends about the periphery of pipe 36, stripper air inlet 39 and perforated pipe sidewall section 40. Stripping air is forced into the jacket 38 under pressure and is distributed into the solid salt by-product by the perforations in the sidewall of pipe 36 within the jacket 38. A 2-5 inch water pressure drop across the bed of salt in standpipes 29 and 36 ensures good stripping of gases from the solid by-product salt. Flow and pressure meters can be employed to measure this pressure drop to verify that successful stripping is occurring. The stripping air ideally is introduced to the jacket 38 through a dessicant to avoid the introduction of moisture into salt. The porous solid salt by-product must be stripped of halogen, such as chlorine, because of the tendency of the halogenated salt to clump together and clog the standpipe and the handling apparatus.

Stripper pipe 36 is fastened with a gas tight seal via flange 42 to valve means 41.

The solids discharge handling apparatus could equally well be connected to a cyclone separator (not shown) employed within the process system to separate out solids.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials, and arrangement of parts which will occur to one of skill in the art upon a reading of the disclosure.

What is claimed is:

1. A reactor vessel system with a reactor to produce a gaseous product and a solid by-product comprising in combination:
    (a) a reactor for the production of the gaseous product and solid by-product from the mixing and reaction of an alkali metal hydroxide and a gaseous halogen, the reactor having a top and an opposing bottom;
    (b) solids discharge handling apparatus containing solid by-product, gaseous product and gaseous halogen connected to the opposing bottom of the reactor at the top of the apparatus and having an opposing bottom, the apparatus including a stripping section to remove gase from the solid by-product within the apparatus;
    (c) a seal formed by a layer of granular solids of the same composition as the solid by-product and replenishable thereby laced within the solids discharge handling apparatus prior to operation and extending in height to a desired minimum level to prevent the intrusion of atmospheric gases and the escape of the gaseous product and the gaseous halogen; and
    (d) valve means to retain initially the granular solids and thereafter the solid by-product within the solids discharge handling apparatus, the valve means underlying and supporting the granular solids and solid by-product and further being connected to the opposing bottom of the apparatus to selectively control the release of solid by-product and granular solids from the solids discharge handling apparatus, wherein the stripper section has an upper portion about which extends an annular standpipe jacket positioned below the opposing bottom of the reactor and above the stripper section jacket, the annular standpipe jacket connecting the stripper section to an elongated generally vertically extending standpipe at the top of the solids discharge handling apparatus and further wherein the reactor comprises gaseous halogen infeed means above alkali metal hydroxide infeed means and flow directing means below the gaseous halogen infeed means to direct the gaseous halogen into the alkali metal hydroxide.

2. The apparatus according to claim 1 wherein the valve means in the solids discharge handling apparatus includes a double airlock system.

3. The apparatus according to claim 2 wherein the stripping section includes a generally elongated vertically extending stripper pipe that has a lower portion about the periphery of which extends a jacket that is previous to a stream of stripping air.

4. The apparatus according to claim 3 wherein the stripper pipe beneath the jacket has a perforated sidewall through which the stream of stripping air is distributed into the solid by product forming the seal within the stripper pipe.

5. The apparatus according to claim 4 wherein the annular standpipe jacket has a stripping air outlet and the jacket has a stripping air inlet to direct flow of the stream of stripping air into and out of the stripping section.

6. The apparatus according to claim 5 wherein a level controller is used to measure the level of the by product in the solids discharge handling apparatus for use in signaling the valve means to discharge solid by-product from the solids discharge handling apparatus.

7. The apparatus according to claim 7 wherein the reactor further comprises means defining a spraying and reaction zone beneath the alkali metal hydroxide infeed means.

8. The apparatus according to claim 7 wherein the reactor further comprises means defining a drying zone beneath the spraying and reaction zone to dry the reaction products.

9. The apparatus according to claim 8 wherein the solid by-product is an alkali metal halide salt.

* * * * *

UNITED STATES PATENT AND TRADEMARK OFFICE
CERTIFICATE OF CORRECTION

PATENT NO. : 5,106,591
DATED : April 21, 1992
INVENTOR(S) : Hilliard et al.

It is certified that error appears in the above-identified patent and that said Letters Patent is hereby corrected as shown below:

In column 6 at line 37, please delete "gase" and insert --gas-- in its place and at line 41, please delete "laced" and insert --placed-- in its place.

In column 7 at line 8, please delete "previous" and insert --pervious-- in its place.

Signed and Sealed this

Twentieth Day of July, 1993

Attest:

MICHAEL K. KIRK

Attesting Officer

Acting Commissioner of Patents and Trademarks